United States Patent [19]

Oliver et al.

[11] 4,239,965
[45] Dec. 16, 1980

[54] METHOD AND APPARATUS FOR NEUTRON INDUCED GAMMA RAY LOGGING FOR DIRECT POROSITY IDENTIFICATION

[75] Inventors: Donald W. Oliver; Richard B. Culver, both of Houston, Tex.

[73] Assignee: Dresser Industries, Inc., Dallas, Tex.

[21] Appl. No.: 17,307

[22] Filed: Mar. 5, 1979

[51] Int. Cl.³ .............................................. G01V 5/00
[52] U.S. Cl. .................................. 250/270; 250/262
[58] Field of Search ........................ 250/270, 269, 262

[56] References Cited

U.S. PATENT DOCUMENTS

| | | | |
|---|---|---|---|
| 3,246,152 | 4/1966 | Caldwell | 250/270 |
| 3,928,763 | 12/1975 | Scott | 250/270 |
| 4,055,763 | 10/1977 | Antkiw | 250/270 |
| 4,135,087 | 1/1979 | Oliver et al. | 250/270 |

*Primary Examiner*—Alfred E. Smith
*Assistant Examiner*—Carolyn E. Fields
*Attorney, Agent, or Firm*—Richard M. Byron

[57] ABSTRACT

In a neutron induced gamma ray well logging instrument, a neutron generator is pulsed at a clock frequency of 20 KHz. Each neutron burst produces inelastic scattering gamma rays which are detected during a first time interval coinciding with the neutron source being on. Capture gamma rays are detected during a second interval subsequent to the end of each neutron burst. Upon detection of the scattered gamma rays, a detection pulse is transmitted during each of the two detection intervals. Sync pulses are generated at a scaled down frequency rate of 200 Hz within the well logging instrument for transmission to the earth's surface. The scaled-down sync pulses are applied to a phase-locked loop system for regenerating the sync pulses to the same frequency as that of the clock frequency used to pulse the neutron source and to open the detection gates in the borehole instrument. The regenerated sync pulses are then used in surface instrumentation to route the pulse occurring during the inelastic scattering interval to one section of a multi-channel analyzer. Similarly, the pulse occurring in the capture interval is routed into another section of the multi-channel analyzer. The use of memory address decoders, subtractors and ratio circuits enables both a carbon/oxygen ratio and a hydrogen/iron ratio to be obtained, substantially independent of chlorine content of the borehole and formation.

13 Claims, 6 Drawing Figures

METHOD AND APPARATUS FOR NEUTRON INDUCED GAMMA RAY LOGGING FOR DIRECT POROSITY IDENTIFICATION

BACKGROUND OF THE INVENTION

This invention relates generally to radiological well logging methods and apparatus for investigating the subsurface earth formations traversed by a borehole and, more particularly, to an improved method and apparatus for high frequency pulsed neutron gamma ray logging wherein gamma rays resulting from neutron inelastic scatterings and thermal neutron capture are selectively detected and the spectral distribution of the gamma rays is determined.

A number of well logging techniques in use come under a general classification of neutron induced radiological well logging. In their basic form, these techniques involve irradiating subsurface earth formations with neutrons and then determining the effect of select formation constituents on the neutrons by measuring either gamma rays produced by inelastically scattered neutrons or the gamma rays resulting from thermal neutron capture. The detection of these radioactive signals returning to the borehole can provide information as to the porosity, lithology and presence or absence of hydrocarbons within the formation. One property of subsurface formations of particular interest is porosity, which in rocks, is space not occupied by solid material, expressed in percent of bulk formation volume. In subsurface formations this pore space is ordinarily occupied by fluids which are hydrogenous in composition and it is well known that hydrogen has a significant capture cross section for slow neutrons. Thus, a measurement of the slow neutrons emanating from irradiated formations or a measurement of the number of gamma rays produced by thermal neutron capture reactions will furnish qualitative indications of hydrogeneity.

In the prior art it has been proposed to irradiate subsurface earth formations with a source of neutrons and measure the resulting neutron population that returns to the borehole at a preselected distance from the source. An example of such prior art instrumentation for determining porosity is described in U.S. Pat. No. 3,621,255 to R. J. Schwartz, where the neutron population returning to the borehole is sampled by a pair of neutron detectors spaced at different distances on the longitudinal axis from the neutron source. Due to the necessity of providing large counting rates, so that statistical deviation will be minimized, the source-detector spacings must be shorter than would be desired. As a result of this short detector spacing, the counting rates at the two detectors are affected, unequally, by changes in porosity. Thus, these instruments only provide a measurement related to porosity and not a measurement of true porosity. In addition, extreme care must be taken in matching detectors and discriminator level settings to provide signal validity. As a result of these problems this instrumentation lacks calibration stability needed for true porosity measurement.

Accordingly, it has been proven difficult to establish a measurement of true formation porosity. While some prior art methods and apparatus have functioned well in certain conditions, no induced gamma ray logging system has provided a formation porosity measurement substantially independent of chlorine content of the borehole and formation.

SUMMARY OF THE INVENTION

The present invention provides method and apparatus for determining the porosity of the formation surrounding a borehole with the porosity measurement being substantially independent of chlorine content of the borehole and formation. A neutron generator located in a well logging instrument is pulsed at a predetermined rate. Inelastic scattered gamma rays are detected being energized and capture gamma rays are measured during a second interval following each neutron burst. Once detection occurs, only a single pulse is transmitted during each detection interval. Sync pulses generated in the well logging instrument are scaled to a lower frequency by subsurface electronics for ease of transmission.

The generated pulses are used in the subsurface instrument to open detection gates and are used at the surface to direct pulses occurring in the inelastic interval to one section of a multi-channel analyzer memory and pulses from the capture interval to another section in the analyzer.

Address decoders, subtractors and ratio circuitry are used to generate a carbon/oxygen ratio. Further, there is generated a first electrical signal functionally related to the summed gamma rays resulting from the captured thermal neutrons within a pair of non-contiguous energy windows in the thermal neutron capture spectra to provide an indication of the salinity compensated hydrogen. Additionally there is generated a second electrical signal functionally related to the gamma rays resulting from the thermal neutrons within a third energy window in the thermal neutron capture spectra to provide an indication of iron. The first and second electrical signals are combined to provide a third electrical signal which is a substantially chlorine independent indication of porosity.

The advantages of the present invention will be more readily understood by those skilled in the art from a reading of the following detailed specification and drawing, in which.

Figure 5:
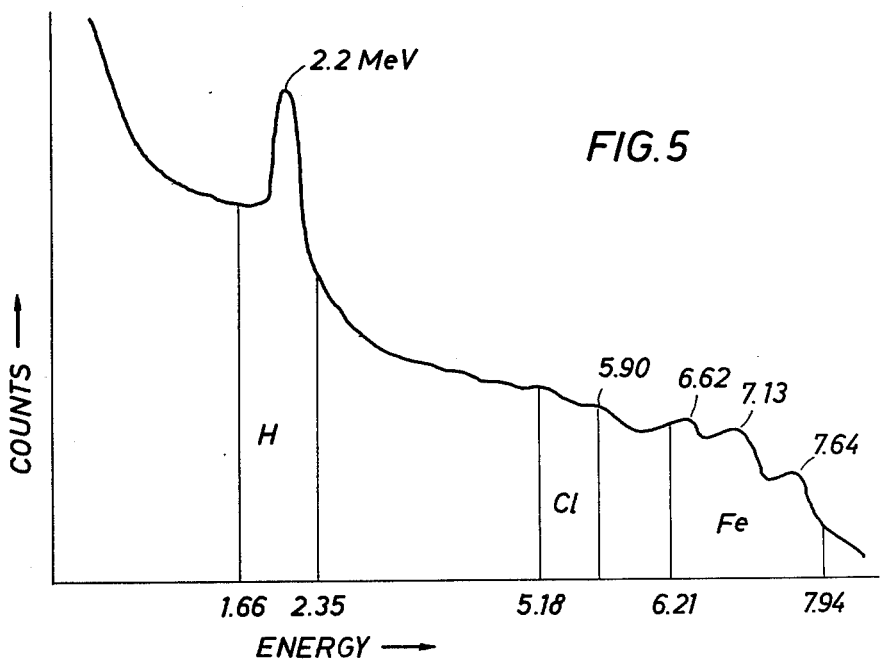
Figure 6:
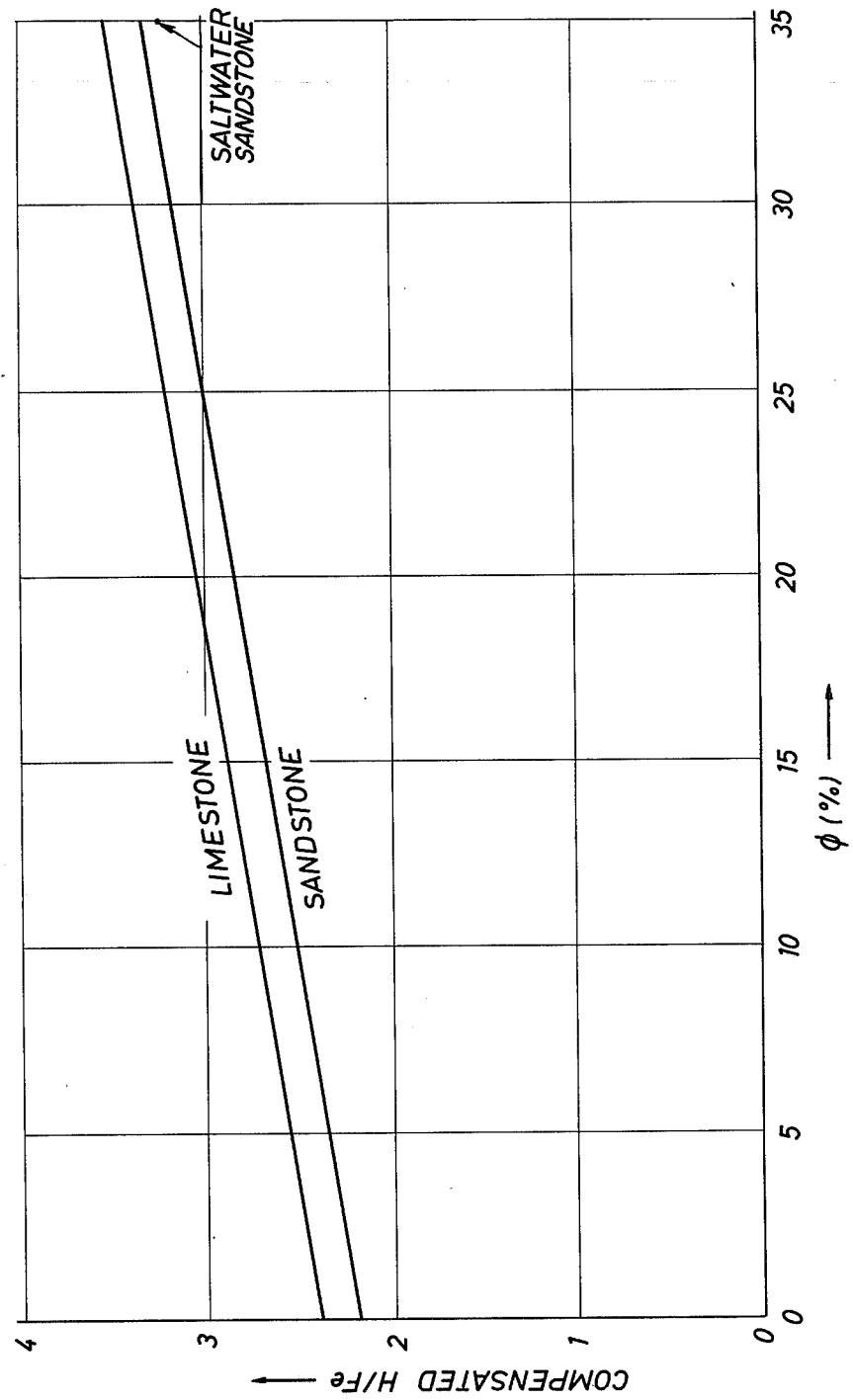

FIG. 5 graphically illustrates a spectral capture curve showing the energy window exemplary of the present invention;

FIG. 6 graphically illustrates the non-salinity sensitive nature of the porosity data using the energy window in accordance with the present invention.

Figure 1:
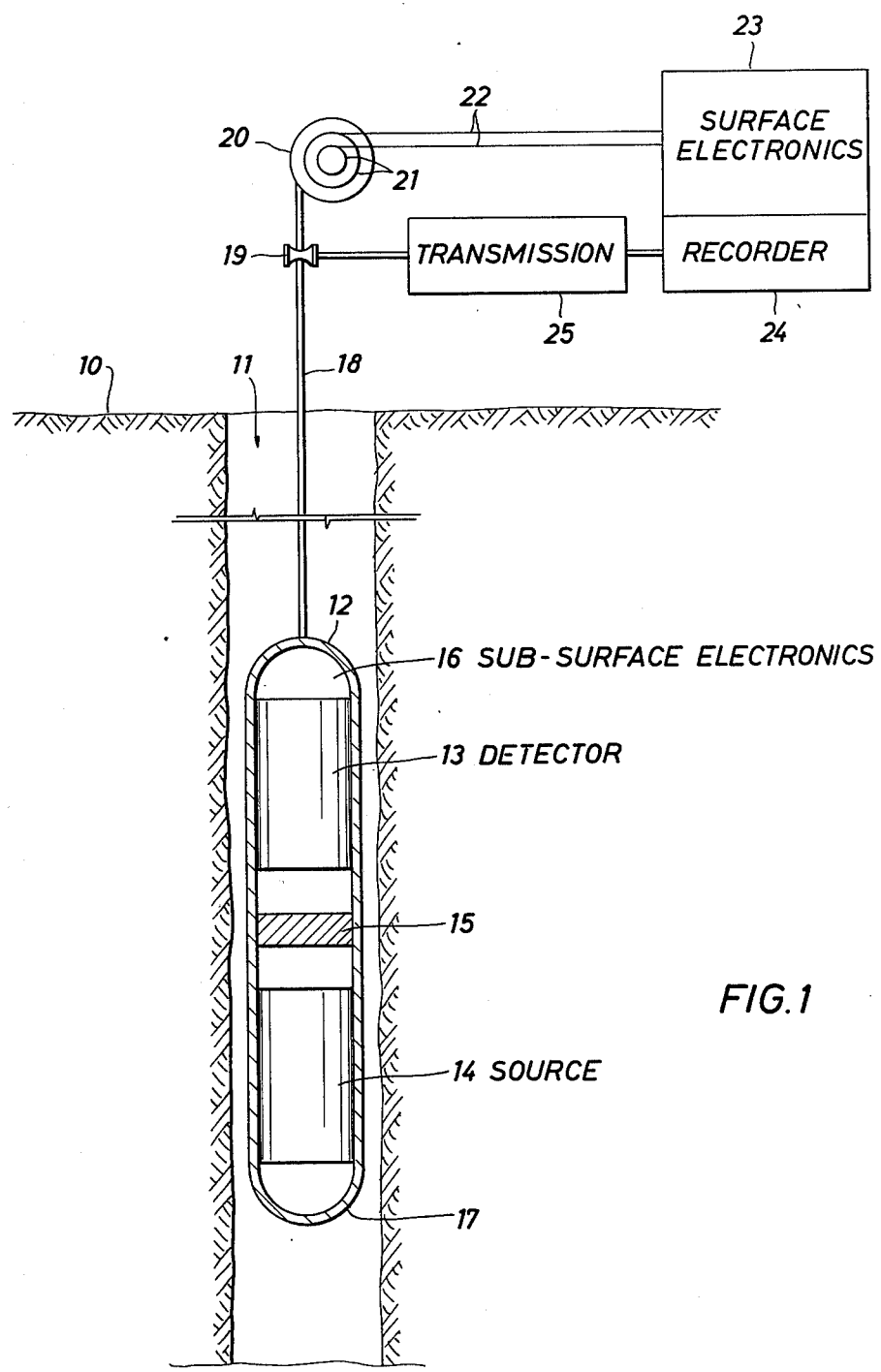
FIG. 1 is a side elevation, partly in cross section, of a borehole logging instrument in operative position and its associated surface circuitry and related equipment.

Referring now to the drawing in more detail, particularly to FIG. 1, there is illustrated schematically a radioactivity well surveying operation in which a portion of the earth 10 is shown in vertical section. Well 11 penetrates the earth's surface and may or may not be cased. Disposed within the well is the subsurface instrument 12 of the well logging system. Subsurface instrument 12 comprises a detecting system 13 and a pulsed neutron source 14. Cable 18 suspends the instrument in the well and contains the required conductors for electrically connecting the instrument with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum, the signals are conducted by means of conductor 22 to the surface electronics 23, where such signals are processed and then recorded on the recorder 24 as explained in more detail hereinafter. Recorder 24 is driven through transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and to provide adequate space within it to house the necessary apparatus and permit the transmission of radiation through it. The subsurface signals are processed in the subsurface electronics 16 as described in greater detail hereinafter.

In a well logging operations such as is illustrated by the apparatus of FIG. 1, the neutron source and detector in the subsurface instrument 12 are separated from the surface processing and recording equipment 23 by as much as four to five miles of logging cable which carries power and signals. Synchronization pulses must be transmitted along with the detector signals to provide the means for synchronizing the surface processing equipment with the subsurface generating and detecting system.

The sync pulse received at the surface and of the 20,000 odd feet of logging cable commonly encountered in the well logging industry has a width of about ten microseconds due to the poor high frequency response of the cable. At low repetition frequencies, for example, 2,000 Hz or less, the transmission of a sync pulse for each neutron burst is not particularly difficult; however, at high repetition rates, for example, 20 KHz, the sync pulse represents an appreciable amount of the repetition period. If, however, the sync pulses are scaled and transmitted only one or two percent of the time, a significant improvement results since the sync is regenerated at the surface by use of a phase coherent, phase-locked loop.

Figure 2:
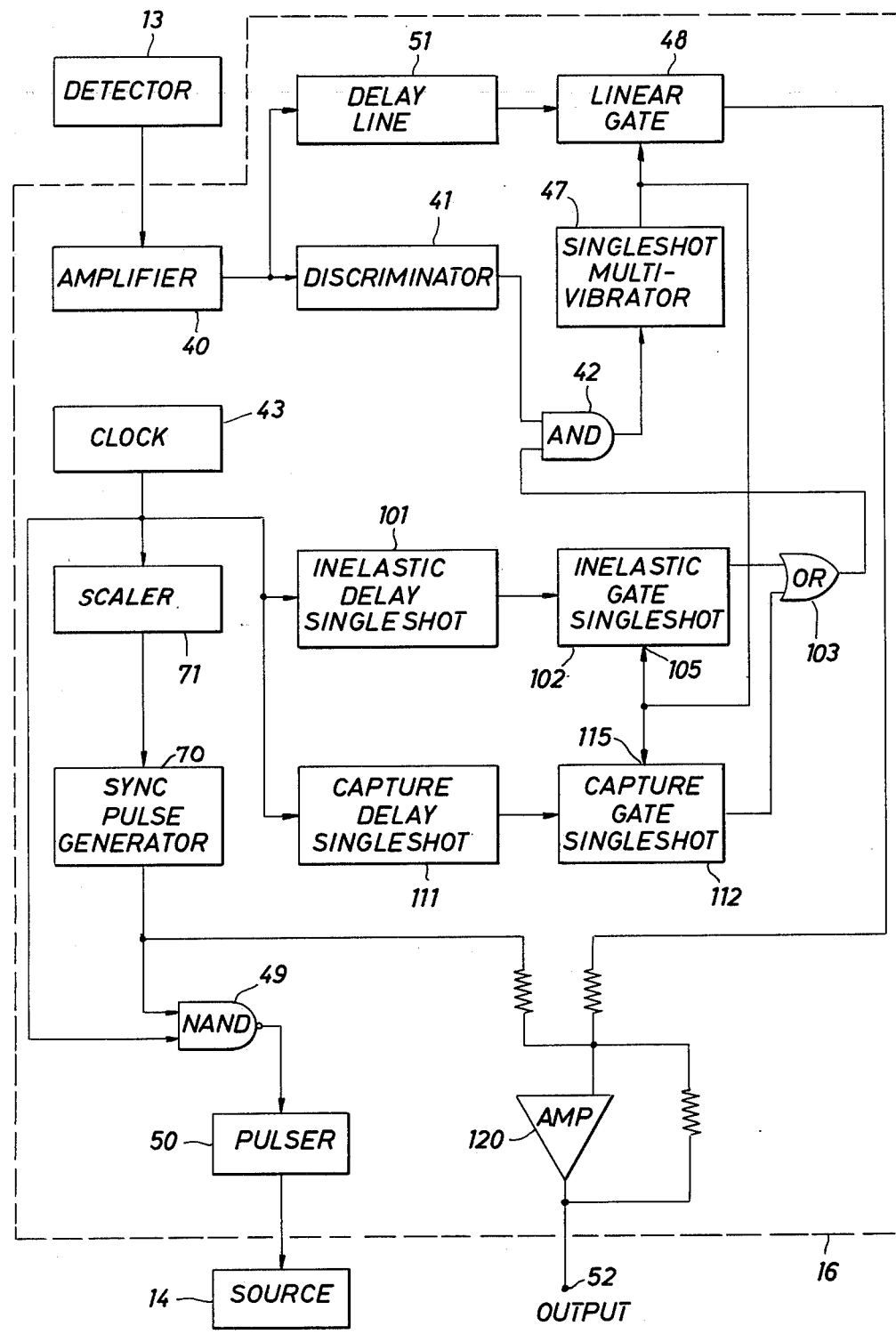
FIG. 2 is a block diagram of the subsurface circuitry according to the present invention.

Referring now to FIG. 2, there is illustrated in block diagram form, the subsurface electronics section 16 connected to the detector 13. The detector 13 is a scintillation counter arranged for gamma ray spectral analysis as is known in the art. In a preferred embodiment, detector 13 is a NaI (T1) crystal having a 2⅜ inch diameter with a 4 inch length. The crystal is coupled to a photomultiplier tube such as the model no. 4523 available from The Radio Corporation of America. The described crystal-photomultiplier combination may give a resolution of 7.5% to 8.5% for the 660 kev cesium 137 peak. To protect the detector from the high temperatures encountered in boreholes the detector may be mounted in a Dewar flask.

The output of detector 13 is coupled into an amplifier 40 within the subsurface electronics section 16. The output of amplifier 40 is coupled into a discriminator 41 which has an output coupled into one of the two inputs of AND gate 42. The discriminator 41 is used to remove pulses having amplitudes below a selectable threshold value which might otherwise cause pile-up on the transmission line normally connected to output terminal 52. A discriminator setting of 400 kev is generally suitable for this purpose. The output of the discriminator 41 is gated by AND gate 42 with a voltage pulse having a nominal width of ten microseconds coupled into the remaining input thereof from OR gate 103. The output signal from AND gate 42 triggers the single shot multivibrator circuit 47 which is nominally set to have a 1.6 microsecond wide pulse output for controlling the linear gate 48. The clock 43 output signal triggers the inelastic delay single shot multivibrator circuit 101 which in turn triggers the inelastic gate width single shot multivibrator circuit 102. These circuits synchronize the opening of linear gate 48 with the pulsing of the neutron source to provide the inelastic gating interval. Multivibrator 102 is a resettable type with a reset input 105. The operation of the circuit is such that if a trigger pulse is applied to input 105 before the end of the cycle initiated by a previous trigger pulse, the cycle time will reset and begin anew. Also, after the circuit is initiated by a trigger pulse, the Q output will remain high until the end of the cycle time or until a reset pulse is applied, whichever occurs first. The output signal of multivibrator 102 is coupled to one input of OR gate 103. The reset input 105 of single shot 102 is driven by the output of single shot 47. The result of this reset signal is to clear the inelastic gate single shot 102 as soon as the first gamma ray with energy above the discriminator threshold is detected. By using a multivibrator circuit with a reset function for gate single shot 102, a dual function is performed. Firstly, the single shot provides the gate width timing signal for determining the maximum length of the inelastic detection gate, nominally 10 μsec; and secondly it provides for terminating the gate when the first gamma ray pulse above the discriminator threshold is detected, a function performed by a J-K flip-flop in U.S. Pat. No. 3,739,172.

The output from clock 43 is also connected to the capture delay single shot 111 which in turn drives the capture width single shot 112 which also has a reset input 115 and whose output is coupled to the second input of OR gate 103. The reset input terminal 115 of single shot 112 is also driven by the output of single shot 47. The clock 43 output is also used to synchronize the neutron source 14. The pulse from clock 43 actuates, by means of NAND circuit 49, a high voltage pulser 50 arranged to cause the neutron output of source 14 to pulse at the clock frequency, for example, as described in U.S. Pat. No. 3,309,522.

The amplified pulses from amplifier 40 are also coupled into delay line 51, which is nominally set to cause a delay of 0.4 microseconds, the output of which is coupled into linear gate 48. The clock circuit 43 output is also coupled into a scaler circuit 71 which produces output pulses at a frequency scaled down from that of the clock frequency of KHz with scaler circuit 71 producing pulses at a frequency of 200 Hz. The scaler 71 output is coupled into a sync pulse generator 70 which shapes the pulses for application to line amplifier 120 and NAND gate 49. Thus, the scaled sync pulses are generated at a frequency which is 1% of that of the clock 43 frequency. The scaled sync pulses from the sync pulse generator 70 are coupled into the second input of NAND gate 42. Thus, whenever a sync pulse appears on NAND gate 49 input concident with a pulse from the clock circuit 43, there is no output produced from NAND gate 49 and the neutron source 14 is not pulsed. In short, source 14 pulses every time the clock 43 pulses except for those times when the scaled sync pulses are produced.

In addition to the scaled sync pulses, the output from linear gate 48 is coupled to line amplifier 120 which in turn is coupled to line 18 by connection to terminal 52.

In the operation of the circuitry of FIG. 2, it should be readily apparent that the circuits of multivibrators 111 and 112 are duplicates of the circuits of multivibrators 101 and 102. The difference lies in the time constant associated with each circuit which allows there to be two gating intervals which are separated in a preferred embodiment by a delay of approximately 25 microseconds from the beginning of the first to the beginning of the second. As will be explained hereinafter, the first gating interval occurs during the time the neutron source is turned on and allows for the detection of radioactivity resulting from inelastic scattering and the second gating interval allows for the measurement of neutron capture resulting from the pulsing of the neutron source.

In the operation of the circuitry of FIG. 2, the first detector pulse exceeding the threshold of the discriminator 41 and commencing within the time interval of the gate pulse from OR gate 103 is passed by linear gate 48 to amplifier 120. Further, gating the 10 microsecond pulse from OR gate 103 with the discriminator 41 output through AND gate 42, provides the trigger for the single shot multivibrator. This controls the opening of the linear gate, rather than triggering the single shot multivibrator 47 from the discriminator 41 and gating the single shot multivibrator output and the OR gate pulse for the linear gate control signal. As a result, a detector pulse occurring near the end of the clock pulse interval is passed as a full width pulse instead of being chopped off as would otherwise occur. It should be noted that the multivibrator 102 is reset on the leading edge of the output pulse from multivibrator 47, disabling AND gate 42. Thus, only the first detector pulse occurring during the interval determined by multivibrator 102 is passed by the linear gate 48, with the pulse being outputted full width even when it occurs late within the clock interval.

As hereinabove set forth, the circuit associated with the second gating interval, i.e., discriminator 41, delay line 51 and multivibrators 111 and 112, operate substantially identical with that above described with a different time delay. Multivibrator 111, having a nominal time constant of 25 microseconds, enables the neutron capture radiation to be detected. As above described, only a single pulse is passed when pulses occurring within the 10 microsecond gate interval determined by multivibrator 112 are detected. These pulses are passed through the linear gate 48 to the amplifier 120 and the pulse output from linear gate 48 again is full width, even should it occur late within the gate interval.

Figure 3:
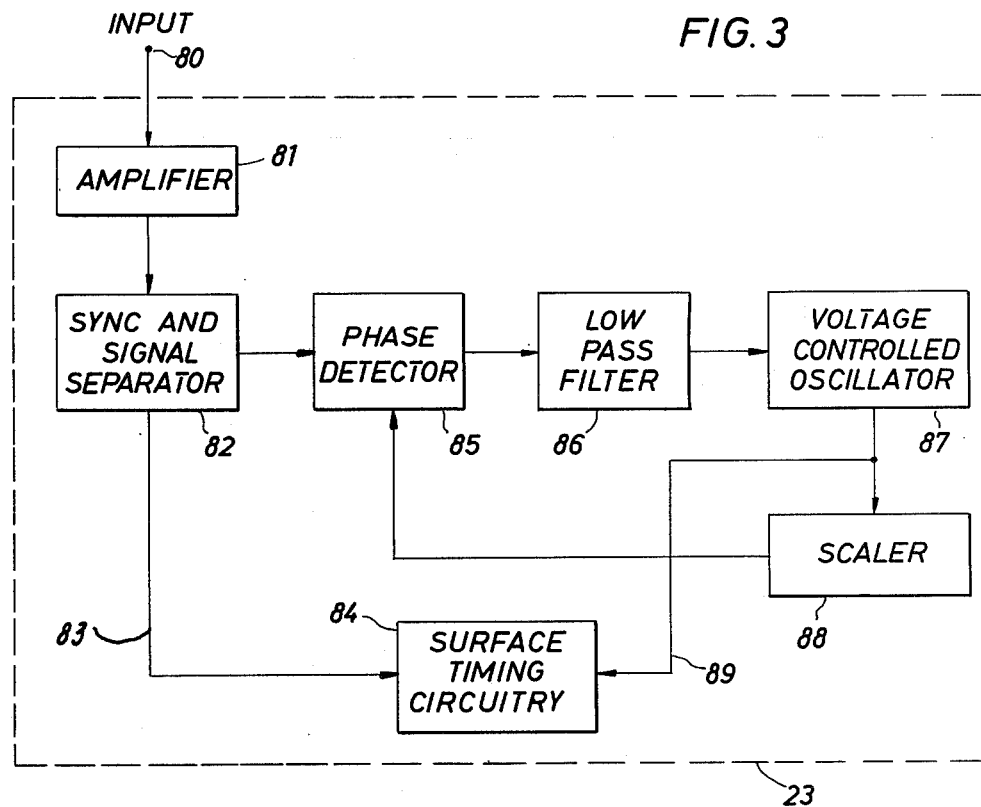
FIG. 3 is a block diagram of the surface circuitry according to the present invention.

Referring now to FIG. 3, the surface electronics circuitry 23 is illustrated in greater detail. Pulses from the logging cable are coupled through input terminal 80 into amplifier 81 whose output signal is coupled to a conventional sync and signal separator circuit 82. If the sync and signal pulses are of opposite polarity, they can be separated by polarity-sensitive circuitry and if they are of the same polarity, they can be separated by a voltage discriminator circuit well known in the art. In a preferred embodiment, the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of the sync and signal separator by conductor 83 into the surface timing circuitry 84 which is described in greater detail hereinafter.

The sync pulses from the sync and signal separator circuit 82 are coupled into a phase detector circuit 85, the output signal of which is coupled through a low pass filter 86 and into a voltage controlled oscillator 87. The output signal from the voltage controlled oscillator 87 is coupled into a scaler 88 and also into the surface timing circuitry 84 by conductor 89. The output of the scaler circuit 88 is coupled back into phase detector circuit 85.

In the operation, and still referring to FIG. 3, the combined sync and signal pulses are coupled into sync separator 82 where the sync pulses are separated and shaped to provide a reference frequency for the phase detector circuit 85. The phase detector output is filtered and used as the controlling voltage for the voltage controlled oscillator 87. The oscillator output is scaled by a frequency divider and coupled into the second input of the phase detector circuit 85. When the loop is in phase lock, the voltage controlled oscillator output frequency is equal to the product of the reference input frequency and the scaler ratio. Thus, if the subsurface system runs at a clock frequency of 20 KHz and the sync pulses are scaled and transmitted at a 200 Hz rate, a scaler of 100 (scaler 88) will provide a 20 KHz output from the voltage controlled oscillator. This 20 KHz signal, now in phase lock with the subsurface clock, provides the synchronization between the subsurface and the subsurface systems. Thus, it can be seen that this system extends the upper usable pulsing frequency while maintaining a fairly safe margin against random coincidence between the sync pulses and the signal pulses. The design criteria for phase-locked loop systems is well known and specially-designed integrated circuits are available for their implementation. See, for example, the *Phase-Locked Loop Data Book*, Second Edition, August, 1973, published by Motorola, Inc.

Figure 4:
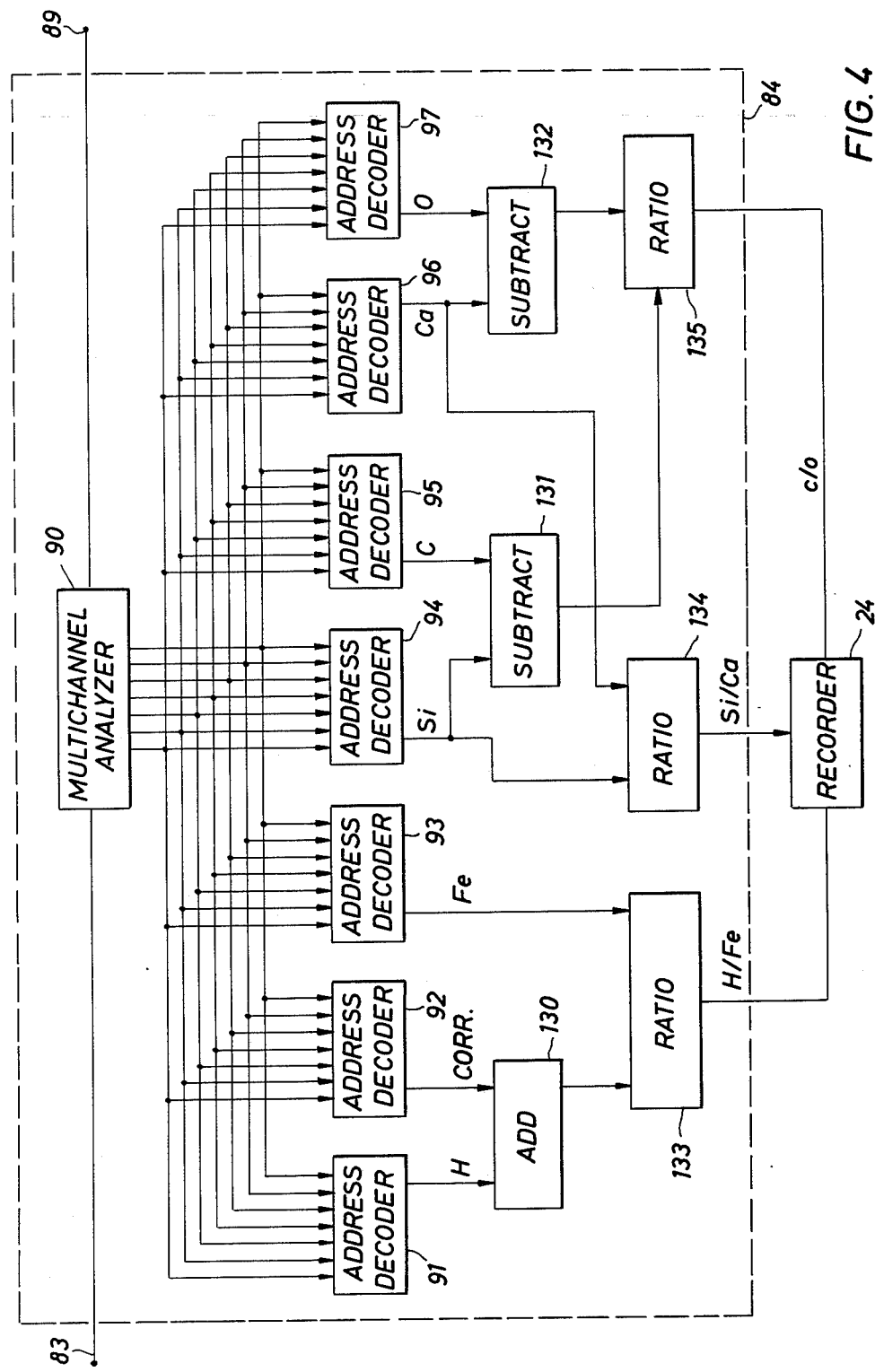
FIG. 4 is a block diagram showing in greater detail a portion of the surface circuitry of FIG. 3.

Referring now to FIG. 4, the surface timing circuitry 84 of FIG. 3 is shown in greater detail. The conductors 83 and 89, illustrated in FIG. 3, are coupled into a multichannel analyzer 90 having seven outputs which are each connected to seven address decoders identified by the numbers 91-97, respectively. The outputs of the address decoders 91 and 92 are connected to an addition circuit 130. The outputs of address decoders 94 and 95 are connected to a subtraction circuit 131. The output of address decoders 96 and 97 are connected to a subtraction circuit 132. The output of addition circuit 130 and the output of the address decoder 93 are connected to a ratio circuit 133 whose output signal is recorded by a recorder 24. The output of address decoder 94 and the output of address decoder 96 are connected to a ratio circuit 134 whose output signal is recorded by recorder 24. The output of the subtraction circuit 131 and the output of the subtraction circuit 132 are connected to a ratio circuit 135 whose output signal is recorded by recorder 24.

The operation of the multi-channel analyzer and the address decoders is explained in greater detail in U.S. Pat. No. 4,013,874, issued on Mar. 22, 1977. In accordance with the present embodiment illustrated and described herein, the address decoder 91 is configured to measure pulses in the 1.66 to 2.35 Mev band. The address decoder 92 is configured to measure pulses in the 5.18 to 5.90 Mev band. The address decoder 93 is configured to measure pulses in the 6.21 to 7.94 Mev band. The window for the address decoders 91, 92, and 93 are graphically illustrated in FIG. 5, which shows a typical thermal neutron capture curve following a neutron burst. The address decoders 94 and 95 are each configured to measure pulses in the 3.17 to 4.65 Mev band. The address decoders 96 and 97 are each configured to measure pulses in the 4.86 to 6.34 Mev band.

In operation, the address decoders 94, 95, 96 and 97 provide information, respectively, with regard to the carbon and oxygen windows which are as known in the prior art. Thus, ratio circuit 134 provides a silicon/calcium ratio, and ratio circuit 135 provides a carbon/oxygen ratio, each of which is recorded by surface recorder 24.

The output of the address decoder 91, being indicative of the energy window which encompasses a hydrogen peak and the output of the address decoder 92, being indicative of an energy window which encompasses a salinity correction energy area, are each connected to the addition circuit 130 wherein the counts from a pair of non-contiguous energy windows are summed. This sum is divided by the output of the address decoder 93 to provide a hydrogen/iron ratio which is substantially unaffected by the salinity of the borehole. This ratio is then recorded by recorder 24, providing a measurement of subsurface earth formation porosity. The compensated H/Fe ratio can be mathematically stated by the expression:

$$\text{Compensated H/Fe} = \frac{H + CORR.}{Fe}$$

where H is the number of gamma rays corresponding to the energy interval 1.66 to 2.35, CORR represents the number of gamma rays corresponding to energy interval 5.18 to 5.90 which is dominated by chlorine, and Fe is the number of gamma rays corresponding to the energy interval 6.21 to 7.94.

Referring now to FIG. 6, the graphic data illustrates how the compensated H/Fe ratio, as derived in test pits of known porosity and lithology, shows virtually all salinity effects are eliminated even at high porosity and high salinity levels. As indicated by FIG. 6, the deviation at 35% porosity between the Sandstone curve and the saturated saltwater sandstone point, and the linear response of the Sandstone and Limestone curves, indicate that under the most severe conditions, high porosity and high salinity, the Sandstone and Limestone curves are substantially independent of salinity effects. The linear response of the test data permits an expression for porosity as follows:

$$\phi = \frac{(\text{Compensated H/Fe} - \text{Lime Correction} - b) \times 100\%}{m}$$

where the lime correction is:

$$\frac{\text{Percentage lime}}{100} \times \Delta \quad (2)$$

where $\Delta$ is the separation between the sand line and the limestone data line. In equation 1, b represents the y-intercept of the sand line, which is the H/Fe ratio at zero porosity, and m is the slope of the water sand data line.

Thus, there has been described and illustrated herein a system in accordance with the pesent invention where a new and improved method and apparatus are described which provide direct porosity data which is substantially insensitive to the borehole and formation salinity. However, those skilled in the art will recognize that obvious modifications can be made to the preferred embodiments without departing from the spirit of the invention. For example, instead of using a neutron source pulsed at a high frequency rate, the principles of the invention can be utilized by using a continuous source of neutrons as from an isotope americium-beryllium source. Furthermore, instead of the multi-channel analyzer and address decoders described herein, data representative of the entire spectrum can be stored in an adapted computer and selected energy intervals selected by soft-ware programming from which the porosity response is calculated.

The embodiments of the invention in which an exclusive property or privilege is claimed are defined as follows:

1. A method of well logging, comprising the steps of:
    irradiating the environments surrounding a borehole with high energy neutrons;
    detecting radiations emanating from said environments being irradiated by said neutrons;
    generating first electrical signals based upon said detected radiations relating to the hydrogen content of said irradiated environment;
    generating second electrical signals based upon said detected radiation relating to the chlorine content of said irradiated environment;
    generating third electrical signals based upon said detected radiations relating to the iron content of said irradiated environment;
    generating fourth electrical signals functionally related to the sum of said first and second electrical signals; and
    generating fifth electrical signals functionally related to the ratio of said fourth and third electrical signals.

2. The method according to claim 1 wherein said first electrical signals are functionally related to detected gamma radiation within a first energy band and said second electrical signals are functionally related to detected gamma radiation within a second energy band non-contiguous to said first energy band.

3. The method according to claim 2 wherein said third electrical signals are functionally related to detected gamma radiations within a third energy band representing gamma radiations of energy greater than said second energy band.

4. A method of well logging, comprising the steps of:
    irradiating the region surrounding a borehole with high energy neutrons;
    detecting radiations emanating from said irradiated region;

generating first electrical signals responsive to said detected radiation relating to the hydrogen content of said irradiated region;

generating second electrical signals responsive to said detected radiation relating to the chlorine content of said irradiated region;

generating third electrical signals responsive to said detected radiation relating to the iron content of said irradiated region;

combining said first and second electrical signals to provide a fourth electrical signal representing a salinity corrected hydrogen indications; and combining said third and fourth electrical signals to provide a porosity indication substantially free of borehole salinity and formation salinity effects.

5. The method according to claim 4 wherein said first electrical signals are functionally related to detected gamma radiations within a first energy band and said second electrical signals are functionally related to detected gamma radiation within a second energy band non-contiguous to said first energy band.

6. The method according to claim 5 wherein said third electrical signals are functionally related to detected gamma radiation within a third energy band of an energy level above said second energy band.

7. The method according to claim 5 wherein said first energy band comprises the energies between 1.66 MeV and 2.35 MeV, and said second energy band comprises the energies between 5.18 MeV and 5.90 MeV.

8. The method according to claim 6 wherein said third energy band comprises the energies between 6.21 MeV and 7.94 MeV.

9. In a method determining the hydrogen/iron ratio of the area surrounding a borehole in which said areas are irradiated with high energy neutrons, gamma radiation is detected and first and second electrical signals are generated indicative of the hydrogen and iron content, respectively, of said area, the improvement comprising said first electrical signals being functionally related to the detected gamma radiation from first and second non-contiguous energy bands and said second electrical signals being functionally related to the detected gamma radiation from a third energy band located in the upper extremity of the detected energy levels.

10. The method according to claim 9 wherein said first energy band comprises the energy levels between 1.66 MeV and 2.35 MeV and said second energy band comprises the energy levels between 5.18 MeV and 5.90 MeV and said third energy band comprises the energy levels between 6.21 MeV and 7.94 MeV.

11. Apparatus for determining porosity of the formations surrounding a borehole, comprising:

an elongated logging instrument adapted to traverse a borehole;

a source of high energy neutrons within said instrument for irradiating regions surrounding said instrument; and gamma radiation detector means for generating first electrical signals indicative of a salinity compensated hydrogen content of said formations and second electrical signals indicative of iron content of said regions, said first electrical signals being functionally related to gamma radiations within first and second non-contiguous energy bands.

12. The apparatus according to claim 11, including means for providing a ratio of said first and second electrical signals.

13. The apparatus according to claim 11, wherein said second electrical signals are functionally related to gamma radiation within an energy band at an energy level above said first and second energy bands.

* * * * *